(12) United States Patent
Wang et al.

(10) Patent No.: US 9,434,618 B2
(45) Date of Patent: Sep. 6, 2016

(54) METHOD FOR MAKING CARBON NANTOUBE FILM

(71) Applicant: Beijing FUNATE Innovation Technology Co., LTD., Beijing (CN)

(72) Inventors: Yu-Quan Wang, Beijing (CN); Li Qian, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 123 days.

(21) Appl. No.: 13/928,364

(22) Filed: Jun. 26, 2013

(65) Prior Publication Data

US 2014/0210125 A1    Jul. 31, 2014

(30) Foreign Application Priority Data

Jan. 30, 2013  (CN) .......................... 2013 1 00354340

(51) Int. Cl.
| | | |
|---|---|---|
| C01B 31/00 | (2006.01) |
| C01B 31/02 | (2006.01) |
| B82Y 30/00 | (2011.01) |
| B82Y 40/00 | (2011.01) |

(52) U.S. Cl.
CPC ........ C01B 31/0253 (2013.01); *B32B 2313/04* (2013.01); *B82Y 30/00* (2013.01); *B82Y 40/00* (2013.01); *C01B 31/022* (2013.01)

(58) Field of Classification Search
CPC ..... B82Y 30/00; B82Y 40/00; C01B 31/022; C01B 31/0253; C01B 31/0266; B32B 2313/04; H01J 2329/0455

USPC ....... 156/166, 167, 176, 178, 179, 180, 181; 264/342 R; 977/742
See application file for complete search history.

(56) References Cited

U.S. PATENT DOCUMENTS

| | | | |
|---|---|---|---|
| 2003/0048038 A1* | 3/2003 | Tsai .............................. | 310/328 |
| 2008/0248235 A1 | 10/2008 | Feng et al. | |
| 2009/0159198 A1* | 6/2009 | Wang et al. .................. | 156/281 |
| 2010/0310809 A1* | 12/2010 | Jiang et al. .................. | 428/41.8 |
| 2012/0149112 A1 | 6/2012 | Feng et al. | |
| 2013/0034905 A1* | 2/2013 | Feng et al. .................... | 435/404 |
| 2013/0340922 A1 | 12/2013 | Wei et al. | |

FOREIGN PATENT DOCUMENTS

| | | |
|---|---|---|
| CN | 101239712 | 8/2008 |
| CN | 102526805 | 7/2012 |
| CN | 102911914 | 2/2013 |
| TW | 201208972 | 3/2012 |

* cited by examiner

*Primary Examiner* — Carson Gross
(74) *Attorney, Agent, or Firm* — Zhigang Ma

(57) ABSTRACT

A method includes the following steps. An original carbon nanotube film is provided. The original carbon nanotube film includes a plurality of carbon nanotubes substantially oriented along a first direction. The original carbon nanotube film is suspended. The suspended original carbon nanotube film is soaked with an atomized organic solvent to shrink into a carbon nanotube film. Wherein the atomized organic solvent comprises a plurality of dispersed organic droplets with diameters of larger than or equal to 10 micrometers, and less than or equal to 100 micrometers.

18 Claims, 5 Drawing Sheets

METHOD FOR MAKING CARBON NANTOUBE FILM

RELATED APPLICATIONS

This application claims all benefits accruing under 35 U.S.C. §119 from China Patent Application No. 201310035434.0, filed on Jan. 30, 2013 in the China Intellectual Property Office, the disclosure of which is incorporated herein by reference.

BACKGROUND

1. Technical Field

The present disclosure relates to a method for making a carbon nanotube film.

2. Discussion of Related Art

A carbon nanotube film can be continuously formed by drawing from a carbon nanotube array. The carbon nanotube film is a macroscopic structure, and includes a plurality of carbon nanotubes joined end-to-end by van der Waals force. Some of the carbon nanotubes in the carbon nanotube film are spaced from each other, so the carbon nanotube film allows light to be transmitted. In addition, the carbon nanotubes are substantially oriented along a same direction, thus the carbon nanotube film has excellent various properties, such conductive electricity and heat along axial direction of the carbon nanotubes. The carbon nanotube film can be widely used.

However, the carbon nanotube film is black or grey, which makes the carbon nanotube film not transparent. Thus the carbon nanotube film isn't conducive to be acted as a transparent conductive element.

What is needed, therefore, is to provide a method for making a carbon nanotube film can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
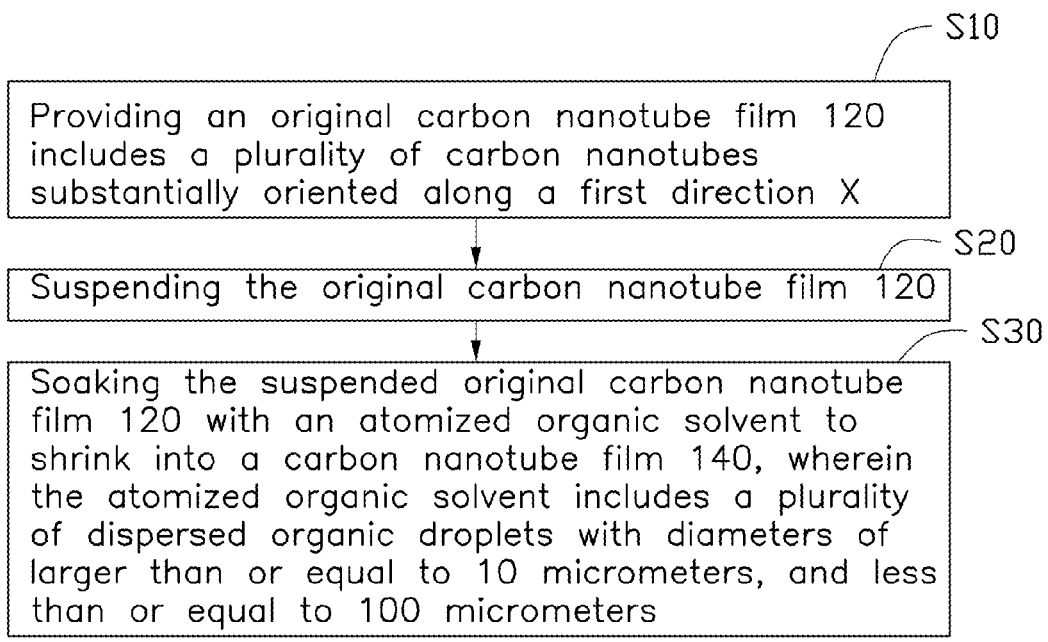
FIG. 1 is a flow chart of one embodiment of a method for making a carbon nanotube film.
Figure 2:
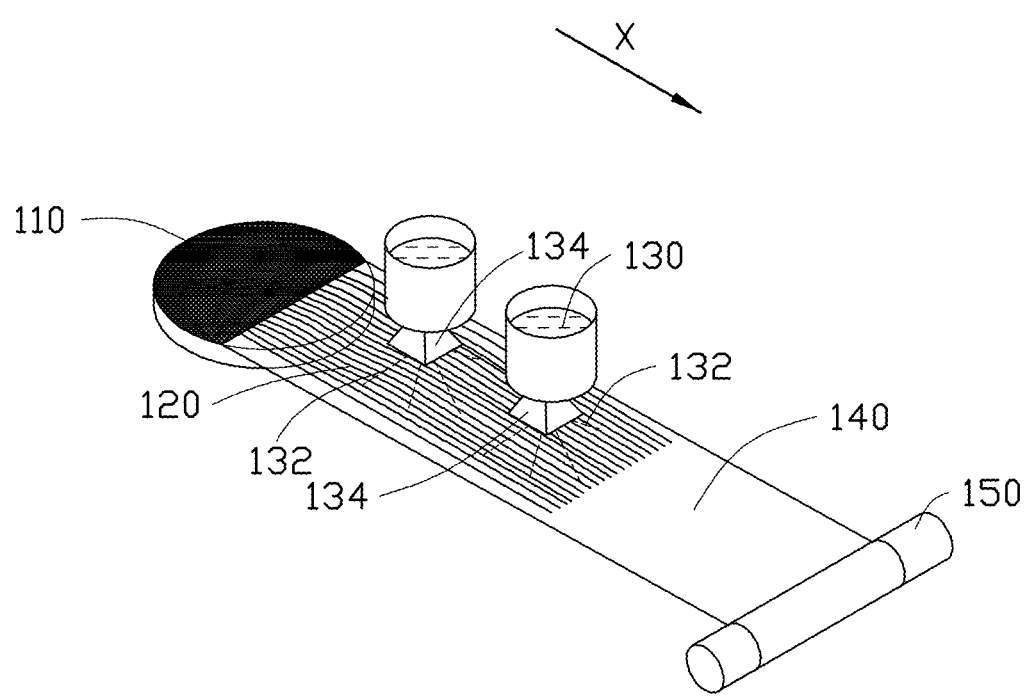
FIG. 2 is a method process view of the method shown in FIG. 1.

Referring to FIGS. 1 and 2, one embodiment of a method for making a carbon nanotube film with high transparent. The method includes the following steps:

S10, providing an original carbon nanotube film 120 including a plurality of carbon nanotubes substantially oriented along a first direction X;

S20, suspending the original carbon nanotube film 120; and

S30, soaking the suspended original carbon nanotube film 120 with an atomized organic solvent to shrink into a treated carbon nanotube film 140, wherein the atomized organic solvent includes a plurality of dispersed organic droplets with diameters of larger than or equal to 10 micrometers, and less than or equal to 100 micrometers.

Figure 3:
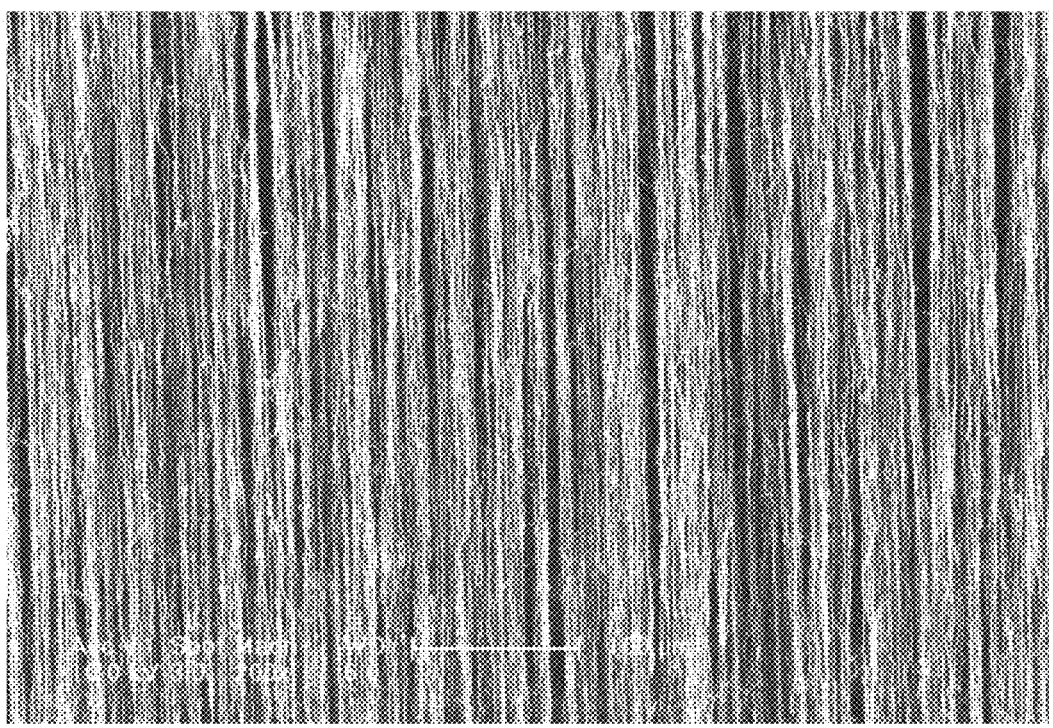
FIG. 3 is a scanning electronic microscopic image of an original carbon nanotube film used in FIG. 1.

In step S10, the original carbon nanotube film 120 is a free-standing structure substantially consisting of a plurality of carbon nanotubes. The term "free-standing structure" includes but is not limited meaning the original carbon nanotube film 120 can keep its film-shape without any support. Referring to FIG. 3, most of the carbon nanotubes in the original carbon nanotube film 120 substantially extend along a same direction. Axial extending directions of the most carbon nanotubes are substantially parallel to a surface of the original carbon nanotube film 120. Furthermore, the original carbon nanotube film 120 includes a plurality of substantially parallel carbon nanotubes and carbon nanotubes joined end-to-end by van der Waals force. Specifically, in the most carbon nanotubes substantially extending along the same direction, each carbon nanotube and adjacent carbon nanotube on the same extending direction are joined end-to-end by van der Waals force. Understandably, a few carbon nanotubes in the original carbon nanotube film are not oriented along the extending directions of the most carbon nanotubes, which does not obviously affect the whole preferred orientation of the most carbon nanotubes in the original carbon nanotube film 120.

The original carbon nanotube film 120 can be made by the following steps:

S111, providing a carbon nanotube array 110; and

S112, drawing the original carbon nanotube film 120 from the carbon nanotube array 110 using a drawing tool.

In step S111, the carbon nanotube array 110 can be a single-walled carbon nanotube array, a double-walled carbon nanotube array, a multi-walled carbon nanotube array, or any combination thereof. In one embodiment, the carbon nanotube array 110 is a multi-walled carbon nanotube array. The carbon nanotube array 110 is essentially free of impurities, such as carbonaceous or residual catalyst particles. The carbon nanotube array 110 can be a super aligned carbon nanotube array including a plurality of carbon nanotubes substantially parallel to each other. A method for making the carbon nanotube array 110 is unrestricted, and can be by chemical vapor deposition methods or other methods.

Step S112 includes steps of:
(a) selecting a number of carbon nanotube segments with a certain width from the carbon nanotube array 110 using a drawing tool; and
(b) pulling the carbon nanotube segments at a uniform speed along the first direction X to form the continuously original carbon nanotube film 120.

The drawing tool having a certain width can be a tape, a tweezers, or a clamp. In one embodiment, the first direction X is substantially perpendicular to a growing direction of the carbon nanotube array 110. The first direction X is substantially parallel to axial extending directions of the carbon nanotubes in the original carbon nanotube film 120.

During the pulling process, as the initial carbon nanotube segments are drawn out, other carbon nanotube segments are also drawn out end to end due to van der Waals force between ends of adjacent segments. This process of pulling produces a substantially continuous and uniform original carbon nanotube film 120 having a predetermined width. During the pulling process, one end of the original carbon nanotube film 120 is connected to the carbon nanotube array 110 by van der Waals force, and the other end is connected to the drawing tool. As such, the original carbon nanotube film 120 is continuously formed. The method for making the original carbon nanotube film 120 is easy and can be applied in industry.

The step S30 is mainly to soak the suspended original carbon nanotube film 120 with the atomized organic solvent at least one time. The atomized organic solvent can be reserved before the step S30. In one embodiment, the atomized organic solvent is prepared during the process of the step S30, as such the step S30 can include steps of: providing a volatilizable organic solvent 130; atomizing the organic solvent 130 into a plurality of dispersed organic droplets 132; and spraying the organic droplets 132 onto the surface of the suspended original carbon nanotube film 120 and the organic droplets 132 gradually penetrating onto the carbon nanotubes of the original carbon nanotube film 120, thereby making the suspended original carbon nanotube film 120 be soaked at least one time by the organic droplets 132, and then make the original carbon nanotube film 120 shrink into the treated carbon nanotube film 140. The organic droplets 132 are tiny organic solvent drops suspended in surrounding. The organic solvent 130 can be atomized into the organic droplets 132 by ultrasonic atomization method, high pressure atomizing method or other methods.

The organic solvent 130 can be alcohol, methanol, acetone, acetic acid, and other volatilizable solvents. During the spraying process, a pressure is produced, when the organic droplets 132 are sprayed, the pressure is small and can't break the original carbon nanotube film 120. The diameter of each organic droplet 134 is larger than or equal to 10 micrometers, or less than or equal to 100 micrometers, such as about 20 micrometers, 50 micrometers. Thus, an interface force is produced between the original carbon nanotube film 120 and the organic droplets 132. The interface force can ensure that the original carbon nanotube film 120 is shrunk and the carbon nanotubes in the original carbon nanotube film 120 are dispersed more uniformly, thereby forming the treated carbon nanotube film 140.

Figure 4:
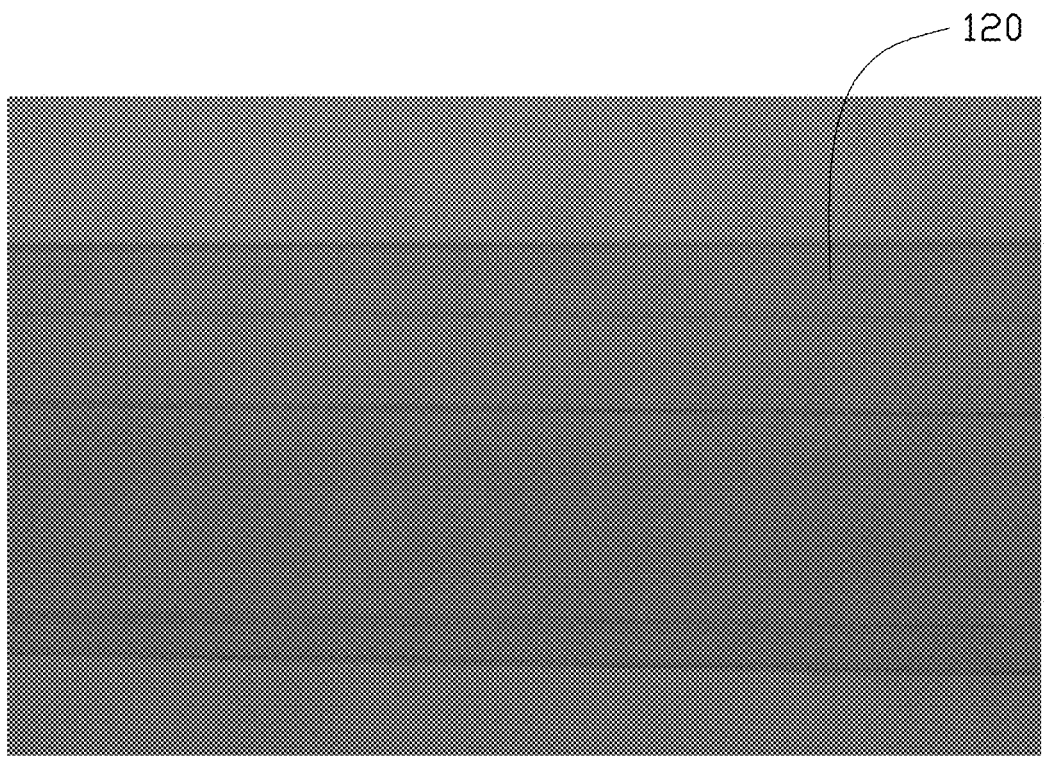
FIG. 4 is a photograph of the original carbon nanotube film shown in FIG. 3.
Figure 5:
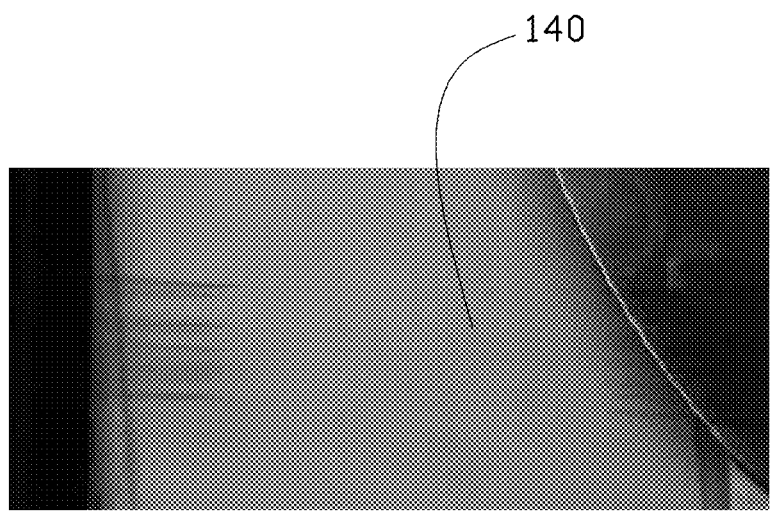
FIG. 5 is a photograph of the carbon nanotube film made by FIG. 1.

The organic solvent 130 is volatile and easy to be volatilized. When the organic droplets 132 are sprayed onto the original carbon nanotube film 120 and then penetrated into the original carbon nanotube film 120, the organic droplets 132 are volatilized, carbon nanotube segments loosely arranged in the original carbon nanotube film 120 are tightly shrunk. The diameter of each organic droplet 134 is larger than or equal to 10 micrometers, or less than or equal to 100 micrometers, the soaked scope of the carbon nanotube segment of the original carbon nanotube film 120 is limited by the small diameter of each organic droplet 134. Thus, diameters of the carbon nanotube segments of the original carbon nanotube film 120 can be shrunk into less than or equal to 10 micrometers, the carbon nanotube segments are substantially invisible using naked eyes in the treated carbon nanotube film 140. The original carbon nanotube film 120 is black or grey shown in FIG. 4, after the step S30, the original carbon nanotube film 120 is shrunk into the treated carbon nanotube film 140, and the treated carbon nanotube film 140 is more transparent shown in FIG. 5. The treated carbon nanotube film 140 is transparent, it can be used as a transparent element. Therefore, the treated carbon nanotube film 140 can be widely used in display devices, such as touch panels.

The step S30 can be a step of soaking the suspended original carbon nanotube film 120 with the atomized organic solvent many times, and the step can include sub-steps of:

S31, providing at least one spray nozzles 134 located above the original carbon nanotube film 120; and S32, moving the at least one spray nozzles 134 or the original carbon nanotube film along the first direction X, simultaneously, atomizing the organic solvent 130 into the dispersed organic droplets 132, the organic droplets 132 being sprayed from the at least one spray nozzles 134 and fallen on the original carbon nanotube film 120, thereby the original carbon nanotube film 120 being soaked and shrunk into the treated carbon nanotube film 140.

When the original carbon nanotube film 120 is soaked many times by the organic droplets 132, the at least one spray nozzle 134 can be one spray nozzle 134 moving above the original carbon nanotube film 120 along the first direction X. Specifically, the suspended original carbon nanotube film 120 is fixed, at the same time, the spray nozzle 134 is moved along a direction substantially parallel to the first direction X to and fro, and the original carbon nanotube film 120 is soaked many times on all directions. The organic droplets 132 sprayed from the spray nozzle 134 cover the original carbon nanotube film 120 not only along the length direction of the original carbon nanotube film 120 substantially parallel to the first direction X, but also along the width direction of the original carbon nanotube film 120 substantially perpendicular to the first direction X. The at least one spray nozzle 134 can be a plurality of spray nozzles 134 arranged along a second direction intercrossed with the first direction X, and the spray nozzles 134 are moved along a direction substantially parallel to the first direction X to and fro, which makes the original carbon nanotube film 120 soaked many times. In one embodiment, the second direction is substantially perpendicular to the first direction X.

The step S30 also can include sub-steps of: providing a plurality of spray nozzles 134 arranged above the original carbon nanotube film 120 along the first direction X; and atomizing the organic solvent 130 into the organic droplets 132, and spraying the organic droplets 132 from each of the spray nozzles 134 onto the original carbon nanotube film 120, simultaneously, moving the original carbon nanotube film 120 along the first direction X, as such the original carbon nanotube film 120 is soaked with the organic droplets 132 many times to form the treated carbon nanotube film 140.

It is not limited how to perform the step S30, as long as the suspended original carbon nanotube film 120 is soaked with the organic droplets 132 on the width direction. In step S30, no mater if a singe spray nozzle 134 or many spray nozzles 134 are provided, the arrangement of the spray nozzle 134 should demand that the organic droplets 132 sprayed from the one or more spray nozzles 134 at least can cover the original carbon nanotube film 120 on the width direction thereof. Therefore, the original carbon nanotube film 120 is uniformly soaked. In one embodiment, the at least one spray nozzle 134 are at least two spray nozzles 134.

In one embodiment, one spray nozzle 134 is moved along the first direction X to and fro, to soak the original carbon nanotube film 120 for two times using the organic droplets 132. Specifically, one end of the original carbon nanotube film 120 is connected to the carbon nanotube array 110, the other end is fixed at a collector 150. The original carbon nanotube film 120 is suspended between the carbon nanotube array 110 and the collector 150. The collector 150 cam make the original carbon nanotube film 120 continuously drawing from the carbon nanotube array 110 along the first direction X. The spray nozzle 134 is located above the suspended original carbon nanotube film 120. The organic solvent 130 is atomized into the organic droplets 132 by the high pressure atomizing method, the organic droplets 132 sprayed from the spray nozzle 134 are falling down to the surface of the suspended original carbon nanotube film 120, thus the original carbon nanotube film 120 is soaked to be shrunk. As the rotating of the collector 150, the original carbon nanotube film 120 will be continuously drawn from the carbon nanotube array 110 along the first direction X, the spray nozzle 134 will move to and fro above the original carbon nanotube film 120 to soak the original carbon nanotube film 120 with the organic droplets 132 for twice. The original carbon nanotube film 120 is shrunk into the treated carbon nanotube film 140. In one embodiment, the organic solvent 130 is alcohol.

The collector 150 is configured to draw the original carbon nanotube film 120 from the carbon nanotube array 110, and collect and lay the treated carbon nanotube film 140.

The original carbon nanotube film 120 is soaked with the organic droplets 132 many times. The original carbon nanotube film 120 is also shrunk many times. During the soaking process many times, the organic droplets 132 fall on different positions of the original carbon nanotube film 120, and the diameters of the organic droplets 132 fallen on the same position of the original carbon nanotube film 120 are also different. The interfacial forces are produced between the organic droplets 132 and the original carbon nanotube film 120 at the same position in order, the interfacial forces are also different at the same position. Therefore, the carbon nanotube segments in the original carbon nanotube film 120 at the same position will be shrunk under the different interfacial forces in order. Because the diameters of the organic droplets 132 are small, the interfacial forces can't make the carbon nanotube segments in the original carbon nanotube film 120 shrunk into black linear structures. After shrinking of the carbon nanotube segments, the shrunk carbon nanotube segments are intercrossed into the treated carbon nanotube film 140 with a uniform network structure. The network structure in the treated carbon nanotube film 140 can be invisible to the naked eyes. Therefore, the treated carbon nanotube film 140 is transparent. The carbon nanotubes in the treated carbon nanotube film 140 are more uniformly arranged, the tensile strength of the treated carbon nanotube film 140 is strong, after the original carbon nanotube film 120 is soaked and shrunk many times in order. After soaking and shrinking the original carbon nanotube film 120 many times, the treated carbon nanotube film 140 is strong enough not to be broken when the treated carbon nanotube film 140 is wrapped around the collector 150. The treated carbon nanotube film 140 can be continuously produced.

Therefore, the method for making the treated carbon nanotube film with high transparent doesn't need using laser, as long as using organic droplets 132 with diameters of larger than or equal to 10 micrometers, and less than or equal to 100 micrometers. The method is simple, high effective, and easy to be performed. In addition, the method is environment friendly and suitable for a large scale produce.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not to restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method comprising:
   providing a carbon nanotube array;
   drawing an original carbon nanotube film from the carbon nanotube array, wherein the original carbon nanotube film comprises a plurality of carbon nanotube segments; and
   soaking the plurality of carbon nanotube segments in the original carbon nanotube film with an atomized organic solvent at least two times to form a plurality of shrunk carbon nanotube segments, and the plurality of shrunk carbon nanotube segments are intercrossed into a carbon nanotube film with a network structure; wherein the atomized organic solvent comprises a plurality of organic droplets with diameters of larger than 20 micrometers, and less than or equal to 100 micrometers.

2. The method of claim 1, wherein the soaking the plurality of carbon nanotube segments in the original carbon nanotube film comprises:
   providing at least one spray nozzle; and
   moving the at least one spray nozzle or the original carbon nanotube film along a direction substantially parallel to a first direction, and spraying the plurality of organic droplets from the at least one spray nozzle on the original carbon nanotube film.

3. The method of claim 1, wherein the soaking the plurality of carbon nanotube segments in the original carbon nanotube film comprises:
   providing a plurality of spray nozzles arranged above the original carbon nanotube film along a first direction; and
   continuously passing the original carbon nanotube film below the plurality of spray nozzles, and spraying the plurality of organic droplets from the plurality of spray nozzles on the original carbon nanotube film.

4. The method of claim 1, wherein the soaking the plurality of carbon nanotube segments in the original carbon nanotube film comprises:
   providing a plurality of spray nozzles arranged along a second direction intercrossed with a first direction; and
   moving the plurality of spray nozzles or the original carbon nanotube film along a direction substantially parallel to the first direction, and spraying the plurality of organic droplets from the plurality of spray nozzles on the original carbon nanotube film.

5. The method of claim 1, wherein a method for atomizing the organic solvent into the plurality of organic droplets is an ultrasonic atomization method or a high pressure atomizing method.

6. The method of claim 1, wherein the organic solvent is alcohol, methanol, acetone, or acetic acid.

7. The method of claim 1, wherein drawing the original carbon nanotube film from the carbon nanotube array further comprises: connecting a first end of the original carbon nanotube film to the carbon nanotube array, and connecting a second end of the original carbon nanotube film opposite to the first end to a collector.

8. The method of claim 7, wherein the drawing the original carbon nanotube film further comprises: moving the collector to continuously draw the original carbon nanotube film from the carbon nanotube array.

9. A method comprising:
providing a carbon nanotube array;
drawing an original carbon nanotube film from the carbon nanotube array along a first direction, a first end of the original carbon nanotube film connected to the carbon nanotube array, and a second end of the original carbon nanotube film connected to a collector, thereby forming a suspended original carbon nanotube film;
applying at least one spray nozzle above the suspended original carbon nanotube film;
atomizing an organic solvent into a plurality of organic droplets, and spraying the plurality of organic droplets by the at least one spray nozzle on the suspended original carbon nanotube film at least two times to soak the suspended original carbon nanotube film such that a carbon nanotube film is formed, and the carbon nanotube film is a network structure; and
rotating the collector such that the carbon nanotube film makes the original carbon nanotube film moving away form the carbon nanotube array and passing below the at least one spray nozzle to be soaked by the plurality of organic droplets in order,
wherein diameters of the plurality of organic droplets are larger than 20 micrometers, and less than or equal to 100 micrometers.

10. The method of claim 9, wherein the applying the at least one spray nozzle above the suspended original carbon nanotube film comprises: providing a plurality of spray nozzles; and arranging the plurality of spray nozzles above the suspended original carbon nanotube film along the first direction.

11. The method of claim 9, wherein the applying the at least one spray nozzle above the suspended original carbon nanotube film comprises: providing a plurality of spray nozzles are arranged above the suspended original carbon nanotube film along a second direction intercrossed with the first direction.

12. The method of claim 9, wherein the soaking the spraying the plurality of organic droplets by the at least one spray nozzle on the suspended original carbon nanotube film comprises: moving the at least one spray nozzle or the suspended original carbon nanotube film along a direction substantially parallel to the first direction.

13. The method of claim 9, wherein the atomizing the organic solvent into the plurality of organic droplets is performed by an ultrasonic atomization method or a high pressure atomizing method.

14. The method of claim 9, wherein the organic solvent is alcohol, methanol, acetone, or acetic acid.

15. The method of claim 1, wherein the soaking the original carbon nanotube film comprises: soaking the original carbon nanotube film with the atomized organic solvent for two times.

16. The method of claim 9, wherein the original carbon nanotube film moves away from the carbon nanotube array and passes below the at least one spray nozzle to be soaked for two times by the plurality of organic droplets.

17. A method comprising:
drawing an original carbon nanotube film from a carbon nanotube array, wherein the original carbon nanotube film comprises a plurality of carbon nanotubes substantially oriented along a same direction; and
soaking the original carbon nanotube film with an atomized organic solvent at least two times, wherein the atomized organic solvent comprises a plurality of organic droplets with diameters of larger than 20 micrometers, and less than or equal to 100 micrometers.

18. The method of claim 17, wherein in step of soaking the original carbon nanotube film with an atomized organic solvent, the plurality of organic droplets fall on different positions of the original carbon nanotube film, the diameters of the plurality of organic droplets fallen on the same position of the original carbon nanotube film are also different, an interfacial forces are produced between the plurality of organic droplets and the original carbon nanotube film at the same position in order, and the interfacial forces are also different at the same position.

\* \* \* \* \*